(12) United States Patent
Hong et al.

(10) Patent No.: US 12,429,929 B2
(45) Date of Patent: Sep. 30, 2025

(54) ALL-IN-ONE COMPUTER WITH DETACHABLE HOST

(71) Applicant: Huawei Technologies Co., Ltd., Shenzhen (CN)

(72) Inventors: Yaqin Hong, Dongguan (CN); Yunhui Peng, Shenzhen (CN); Yu Ni, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 72 days.

(21) Appl. No.: 18/547,425

(22) PCT Filed: Feb. 16, 2022

(86) PCT No.: PCT/CN2022/076484
§ 371 (c)(1),
(2) Date: Aug. 22, 2023

(87) PCT Pub. No.: WO2022/179416
PCT Pub. Date: Sep. 1, 2022

(65) Prior Publication Data
US 2024/0143044 A1    May 2, 2024

(30) Foreign Application Priority Data
Feb. 23, 2021   (CN) .......................... 202110203018.1

(51) Int. Cl.
*G06F 1/18*   (2006.01)
*G06F 1/16*   (2006.01)

(52) U.S. Cl.
CPC ............ *G06F 1/181* (2013.01); *G06F 1/1601* (2013.01)

(58) Field of Classification Search
CPC ...... G06F 1/181; G06F 1/1632; G06F 1/1601; G06F 2200/1631
(Continued)

(56) References Cited

U.S. PATENT DOCUMENTS 6,029,183 A * 2/2000 Jenkins ................. G06F 1/1632
361/679.21
6,108,199 A   8/2000 Bonardi
(Continued)

FOREIGN PATENT DOCUMENTS

CN   101609353 A       12/2009
CN   202522959 U   *   11/2012
(Continued)

*Primary Examiner* — Allen L Parker
*Assistant Examiner* — Dakota M Talbert
(74) *Attorney, Agent, or Firm* — Conley Rose, P.C.

(57) ABSTRACT

An all-in-one computer includes a monitor and a host. The monitor includes a display screen, which has an accommodating cavity with an opening located on a peripheral side of the display screen, and the host is detachably mounted in the accommodating cavity from the opening along a first direction. The monitor is provided with a first connecting assembly, the host is provided with a second connecting assembly, and when the host is mounted in the accommodating cavity, the second connecting assembly is connected to the first connecting assembly to implement signal transmission between the host and the monitor. An arrangement direction of the second connecting assembly and the first connecting assembly is perpendicular to the first direction, and the arrangement direction of the second connecting assembly and the first connecting assembly is parallel to a plane on which the display screen is located.

20 Claims, 13 Drawing Sheets

(58) Field of Classification Search
USPC .................................................. 361/679.22
See application file for complete search history.

(56) References Cited

U.S. PATENT DOCUMENTS

| | | | |
|---|---|---|---|
| 2004/0095339 A1 | 5/2004 | Gothard | |
| 2008/0002350 A1* | 1/2008 | Farrugia | G06F 1/1632 |
| | | | 361/679.43 |
| 2008/0158802 A1* | 7/2008 | Tsuchida | G06F 1/1601 |
| | | | 361/679.54 |
| 2009/0296334 A1* | 12/2009 | Chu | G06F 1/1601 |
| | | | 361/679.22 |
| 2019/0372251 A1* | 12/2019 | Huang | H01R 12/79 |
| 2020/0174523 A1 | 6/2020 | Su et al. | |

FOREIGN PATENT DOCUMENTS

| | | |
|---|---|---|
| CN | 106020345 A | 10/2016 |
| CN | 109407762 A | 3/2019 |
| CN | 208903157 U | 5/2019 |
| CN | 111258377 A | 6/2020 |

\* cited by examiner

ALL-IN-ONE COMPUTER WITH DETACHABLE HOST

CROSS-REFERENCE TO RELATED APPLICATIONS

This application is a U.S. National Stage of International Patent Application No. PCT/CN2022/076484 filed on Feb. 16, 2022, which claims priority to Chinese Patent Application No. 202110203018.1 filed on Feb. 23, 2021. Both of the aforementioned applications are hereby incorporated by reference in their entireties.

TECHNICAL FIELD

This application relates to the technical field of terminal devices, and in particular, to an all-in-one computer.

BACKGROUND

Currently, a product form of a desktop PC (personal computer, personal computer) mainly includes two models. The first model is an independent host plus a monitor. The second model is an all-in-one computer in which functional components implementing functions of a host are disposed in a monitor.

However, the product of an independent host plus a monitor has problems such as presence of many cable connections and large desktop space occupation. Although the all-in-one computer can resolve the problems such as presence of many cable connections and large desktop occupation, there is a problem that the functional components cannot be quickly replaced or updated because the functional components are disposed in the monitor.

Therefore, how to provide an all-in-one computer in which functional components of a host can be quickly replaced is an urgent problem to be resolved.

SUMMARY

This application provides an all-in-one computer, to provide a desktop PC in which functional components of a host can be quickly replaced.

This application provides an all-in-one computer, and the all-in-one computer is used as a terminal device. The all-in-one computer includes a host and a monitor, and the monitor has a display screen. In a practical application, the host is detachably disposed in an accommodating cavity of the display screen. An opening of the accommodating cavity may be located on any one of peripheral sides of the display screen. Generally, a "front side" of the display screen is used to display a picture, and one side opposite to the "front side" is used as the back of the display screen. Therefore, the "peripheral side" refers to the "top", "bottom", "left side", and "right side" of the display screen. To implement signal transmission between the host and the display screen, a first connecting assembly is disposed in the accommodating cavity of the display screen, and a second connecting assembly is disposed in the host. When the host is completely mounted in the accommodating cavity, the first connecting assembly is connected to the second connecting assembly. It should be noted that an arrangement direction of the first connecting assembly and the second connecting assembly is perpendicular to a first direction (that is, an insertion/removal direction of the host). In other words, the first connecting assembly and the second connecting assembly are disposed in a direction perpendicular to the insertion/removal direction of the host. In addition, the arrangement direction of the second connecting assembly and the first connecting assembly is parallel, or certainly, may be approximately parallel_ to a plane on which the display screen is located.

In the all-in-one computer provided in this application, the accommodating cavity is disposed in the display screen, and the opening of the accommodating cavity is disposed on the peripheral side of the display screen. In this way, a user can perform, based on a requirement of the user, an operation of inserting or removing the host, and the user can replace or update a hardware device in the host conveniently. In addition, a connection direction between the first connecting assembly of the monitor and the second connecting assembly of the host is perpendicular to the insertion/removal direction or the host. This can prevent a relatively large force applied between the first connecting assembly and the second connecting assembly along the insertion/removal direction in a host insertion/removal process from damaging the first connecting assembly and the second connecting assembly, thereby prolonging service life of the first connecting assembly and the second connecting assembly.

In specific disposition of a structure of the display screen, for example, the display screen includes a display panel used for a picture display function and a rear housing used for support and protection. Specifically, the rear housing is disposed on the back of the display panel, and cooperates with the display panel to form an accommodating space. An insertion/removal mechanism is disposed in the accommodating space, and a part of the accommodating space is used as the accommodating cavity. The insertion/removal mechanism is configured to perform an operation of inserting or removing the host relative to the monitor, and is capable of improving user experience during the insertion/removal operation.

In specific disposition of a structure of the insertion/removal mechanism, the insertion/removal mechanism includes a baseplate for bearing the host and a locking assembly for locking the host inside the accommodating cavity. When the host enters the accommodating cavity through the opening of the accommodating cavity, the baseplate bears the host, and can move along the insertion direction with the host in the first direction until the locking assembly is in a locked state, and the host is mounted in the accommodating cavity. When the host needs to be removed out of the accommodating cavity, the locking assembly may be switched from the locked state to an unlocked state, to implement a host removal operation. It should be understood that the locking assembly can enhance stability of a connection between the host and the monitor, and can implement quick unlocking when the host needs to be removed. Certainly, when the opening of the accommodating cavity is located on the top, the left side, or the right side of the display screen, the locking assembly may alternatively not be disposed.

In specific disposition of a structure of the locking assembly, for example, the locking assembly includes a lock disposed on the baseplate, and a hook that is in cooperation with the lock and disposed on the rear housing. The hook has a clamping position and an expanding position. When the hook is in the clamping position, the hook clamps the lock and the locking assembly is in the locked state. When the hook is in the expanding position, the locking assembly is in the unlocked state. The locking assembly further includes a driving assembly configured to drive the hook to switch from the clamping position to the expanding position and a button part configured to drive the driving assembly. Specifically, the user may press a portion of the button part that runs through the rear housing and that is located on the back of the rear housing, so that the driving assembly drives the hook to switch from the clamping position to the expanding position. It should be noted that, in a process in which the hook is switched from the clamping position to the expanding position, the hook is expanded from a lock-clamping state, and the locking assembly is switched from the locked state to the unlocked state. The user can press the button part to implement a function of unlocking the locking assembly in one step.

In specific disposition of the driving assembly, for example, the insertion/removal assembly may be disposed to further include a support frame mounted in the accommodating cavity and relatively fixed to the rear housing, so that the baseplate and the support frame are arranged along the first direction and that the baseplate can move relative to the support frame along the first direction. The driving assembly may be a spring set abutting against the baseplate and the support frame. When the locking assembly is in the locked state, the spring set is in an energy storage state to provide a driving force when the hook is switched from the clamping position to the expanding position. Certainly, the driving assembly can further facilitate the host removal operation. Specifically, after the locking assembly is switched from the locked state to the unlocked state, the driving assembly may further continue to apply a driving force to the baseplate along the removal direction of the host, so that the host can be removed from the opening of the accommodating cavity more smoothly.

Certainly, to make a moving state of the baseplate more stable during the movement of the baseplate relative to the support frame, the insertion/removal mechanism may further include a guiding assembly configured to guide the baseplate during the movement of the baseplate. For example, the guiding assembly includes a first guiding element disposed on one side that is of the baseplate and that faces the support frame and a second guiding element disposed on one side that is of the support frame and that faces the baseplate, and the first guiding element corresponds to the second guiding element. During the movement of the baseplate relative to the support frame along the first direction, the first guiding element may move relative to the second guiding element corresponding to the first guiding element. It should be understood that a plurality of pairs of corresponding first guiding elements and second guiding elements may be disposed between the baseplate and the support frame based on a requirement.

In addition, the insertion/removal mechanism may be further disposed to include a limiting assembly configured to limit a movement distance of the baseplate, to more accurately limit a movement distance of the baseplate relative to the support frame in the first direction. For example, the limiting assembly includes a guide groove, disposed on one side that is of the support frame and that faces the baseplate, and extending along the first direction, where the guide groove has a first limiting surface and a second limiting surface that are disposed opposite to each other, the first limiting surface is located on one side close to the support frame and facing away from the support frame, the first limiting surface is used to limit a maximum movement distance of the baseplate along the insertion direction of the host, and the second limiting surface is used to limit a maximum movement distance of the baseplate along the removal direction of the host. The limiting assembly further includes a limiting block, disposed on one side that is of the baseplate and that faces the support frame, and corresponding to the guide groove. Each limiting block is movably embedded along the first direction into a guide groove corresponding to the limiting block. It should be understood that structures of a plurality of pairs of corresponding guide grooves and limiting blocks may be disposed between the baseplate and the support frame based on a requirement.

It should be noted that, to implement a connection operation between the first connecting assembly and the second connecting assembly along a vertical insertion/removal direction, the insertion/removal mechanism in the all-in-one computer provided in this application may further include an inclined guide rail disposed in the accommodating space. Specifically, included angles exist between an extension direction of the inclined guide rail and the first direction, and an included angle that is in the included angles and that faces an opening side of the accommodating cavity is an acute angle; and the first connecting assembly is movably mounted on the baseplate along a direction perpendicular to the first direction, and the first connecting assembly is movably mounted on the inclined guide rail along the extension direction of the inclined guide rail. When the operation of inserting or removing the host is performed, the baseplate moves along the first direction. In this case, the first connecting assembly moves relative to the baseplate in a second direction perpendicular to the first direction, and the first connecting assembly moves relative to the inclined guide rail along the extension direction of the inclined guide rail. It should be noted that the foregoing movement process of the first connecting assembly finally forms a movement of the first connecting assembly relative to the host in the second direction. Specifically, in a process of inserting the host into the accommodating cavity, the first connecting assembly moves relative to the host along the second direction until the first connecting assembly is connected to the second connecting assembly. In a process of removing the host, the first connecting assembly moves along the second direction, from a state of being connected to the second connecting assembly, to a direction away from the host. The insertion/removal mechanism can implement convenient mounting and detachment of the first connecting assembly and the second connecting assembly.

To implement signal transmission between the monitor and the host, for example, the first connecting assembly and the second connecting assembly cooperate to form a high-speed high-density connector. It should be noted that the high-speed high-density connector may support transmission of high-speed signals of HDMI (high definition multimedia interface, high-definition multimedia interface) 2.1, DP (display port, display interface) 2.0, USB (universal serial bus, universal serial bus) 4, or the like, and supply 250 W@12 V power. For example, when the host is mounted in the accommodating cavity, and the first connecting assembly is connected to the second connecting assembly, a function for operating the host can be transferred by using the high-speed high-density connector to the monitor for implementation. In addition, the monitor can supply power to the host by using the high-speed high-density connector. In specific disposition, the first connecting assembly may be provided with a male end of the high-speed high-density connector, and the second connecting assembly may be provided with a female end of the high-speed high-density connector, so that the first connecting assembly is quickly connected to the second connecting assembly.

In specific disposition of a structure of the host, the host includes a chassis, a mother hoard is disposed in the chassis, functional components are mounted on the mother board, and the second connector has a signal connection to the mother board. It should be noted that because the functional components on the mother board generate heat during working, to maintain normal running of the functional components, a heat dissipation structure may be further disposed in the host. The heat dissipation structure may transfer heat inside the chassis to the outside of the chassis, to reduce an ambient temperature inside the chassis, thereby dissipating heat for the functional components. For example, the heat dissipation structure may include a heat sink and a fan structure.

To meet a heat dissipation requirement of the host, in one aspect, in specific disposition of the host, an air intake vent may be disposed on one side that is of the chassis and that faces the rear housing, and an air exhaust vent is disposed on one side that is of the chassis and that presses against the baseplate, so that an air flow channel inside the chassis is formed between the air intake vent and the air exhaust vent. Certainly, to prevent the air exhaust vent from being blocked by the baseplate, a hollow opening may be disposed at a corresponding position of the baseplate, or the baseplate and the air exhaust vent are staggered. In another aspect, in specific disposition of the monitor, the rear housing of the monitor may be provided with a hollow area. Specifically, the hollow area may be divided into a first area and a second area, and the first area and the second area are arranged along a direction from the bottom to the top of the display screen. Because hot air generally rises, the first area corresponds to the air intake vent of the chassis and is used as an air intake vent of the display screen. Correspondingly, the second area is used as an air exhaust vent of the display screen.

In specific disposition of the monitor, generally, the monitor is further provided with a support structure for supporting the monitor. The support structure includes a base and a stand, and the stand is configured to connect the base and the monitor. For example, to adapt to use requirements of different users, the display screen is mounted on the stand with an adjustable elevation angle. In addition, a third connecting assembly may be disposed on the support structure or the monitor. Specifically, the third connecting assembly is configured to connect to an external device to implement a normal function of the monitor, and the third connecting assembly has a signal connection to the first connecting assembly, to form a connection path between the third connecting assembly, the first connecting assembly, and the second connecting assembly.

In the all-in-one computer provided in this application, the host may be further removed out of the accommodating cavity of the monitor and used as an independent host. Based on this, a fourth connecting assembly may be further disposed on the host. Specifically, the fourth connecting assembly includes a power interface, and further includes at least one of an RJ45 interface, an HDMI interface, or a USB (universal serial bus, universal serial bus) interface. When the host is used as an independent host, at least the following several possibilities are included.

In a specific implementation solution, when only the power interface is disposed on the fourth connecting assembly of the host, the power interface of the host may be connected to the monitor by using a cable, so that the monitor supplies power to the host. In addition, a first wireless module of the monitor and a second wireless module of the host are used to implement a data connection between the host and the monitor.

In another specific implementation, when only the power interface is disposed on the fourth connecting assembly of the host, the fourth connecting assembly may be connected to an external power supply device by using a cable, to supply power to the host. In addition, a first wireless module of the monitor and a second wireless module of the host are used to implement a data connection between the host and the monitor.

In another specific implementation, when various interfaces are disposed on the fourth connecting assembly of the host, the interfaces of the host may be independently connected by using different cables, to meet power supply and network requirements of the host. In addition, a cable may be used to connect the host and the monitor to implement data transmission between the host and the monitor.

In another specific implementation, when various interfaces are disposed on the fourth connecting assembly of the host, the interfaces of the host may be independently connected by using different cables, to meet power supply and network requirements of the host. In addition, a first wireless module of the monitor may be connected to a second wireless module of the host to implement a data connection between the host and the monitor.

REFERENCE NUMERALS

001—desktop PC; 01—monitor; 02—host; 03—cable; 10—all-in-one computer; 1—monitor; 11—display screen; 111—display panel; 112—rear housing; 12—support structure; 121—base; 122—stand; 13—insertion/removal mechanism; 131—baseplate; 132—locking assembly; 1321—lock; 1322—locking enclosure; 1323—button part; 1324—hook; 133—support frame; 134—spring set; 135—guide sleeve; 136—guide post; 137—guide groove; 138—limiting block; 139—inclined guide rail; 1391—dovetail groove; 14—first connecting assembly; 141—male end; 142—positioning pin; 143—dovetail head; 15—T-shaped guide rail; 16—third connecting assembly; 17—cable; 2—host; 21—second connecting assembly; 211—female end; 212—positioning guide sleeve; 22—fourth connecting assembly; 23—power button; 24—chassis; 25—mother board; 251—GPU module; 252—second wireless module; 253—CPU module; 254—memory; 26—heat dissipation structure; 261—heat sink; and 262—fan.

DETAILED DESCRIPTION OF EMBODIMENTS

An all-in-one computer provided in an embodiment of this application is used as a terminal device, and is usually used in working scenarios such as nonmobile computing, rendering, and file processing. Specifically, the all-in-one computer provided in this embodiment of this application is a desktop PC (personal computer, personal computer) or a server.

Figure 1:
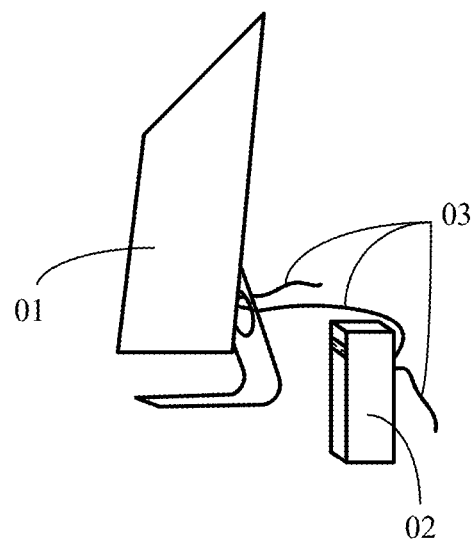
FIG. 1 is a schematic diagram of a structure of a desktop PC in the prior art.

FIG. 1 is a schematic diagram of a structure of a desktop PC in the prior art. In the structure shown in FIG. 1, a monitor 01 and a host 02 of the desktop PC 001 are disposed independently. However, in the desktop PC 001 in FIG. 1, the monitor 01 and the host 02 occupy a relatively large space, and a plurality of cables 03 are connected to the monitor 01 and the host 02, affecting aesthetics.

Figure 2:
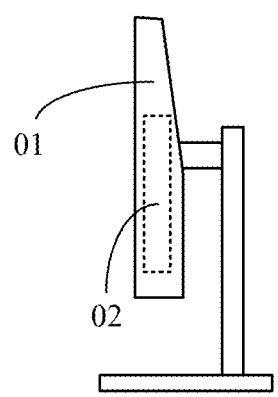
FIG. 2 is a schematic diagram of another structure of a desktop PC in the prior art.

FIG. 2 is a schematic diagram of another structure of a desktop PC in the prior art. In the structure shown in FIG. 2 mechanical parts that implement functions of a host 02 are disposed inside a monitor 01 of a desktop PC 001. In comparison with the desktop PC 001 shown in FIG. 1, the desktop PC 001 shown in FIG. 2 resolves a problem that there are many cables 03 and a problem that a relatively large space is occupied when the host 02 is separately disposed. However, because lifecycles of the monitor 01 and the host 02 are not synchronous, the host 02 ages before the monitor 01. However, because the host 02 is disposed inside the monitor 01, it is difficult to quickly replace or update the host 02.

Figure 3:
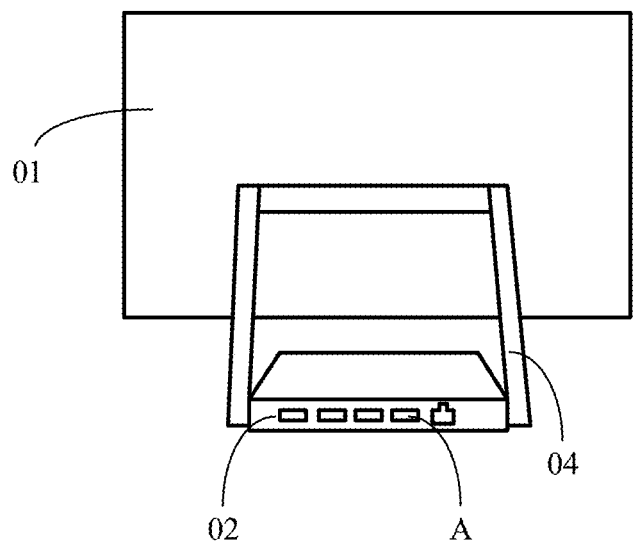
FIG. 3 is a schematic diagram of another structure of a desktop PC in the prior art.

FIG. 3 is a schematic diagram of another structure of a desktop PC 001 in the prior art. In the structure shown in FIG. 3, a host 02 is disposed in a base of a support frame 04 of a monitor 01, and a connection interface A is disposed on the base. The connection interface A enables the monitor 01 and the host 02 in the base to form an all-in-one computer. In comparison with the desktop PC 001 shown in FIG. 2, in the desktop PC 001 shown in FIG. 3, the host 02 is moved from a display part of the monitor 01 to the base. However, when the host 02 is to be updated, the host 02 still needs to be removed from the base of the monitor 01. The removal and mounting are relatively complex, and cables are still exposed, affecting overall aesthetics of the desktop PC 001.

In view of this, this application provides an all-in-one computer, to provide a desktop PC in which functional components of a host can be quickly replaced.

Terms used in the following embodiments are merely intended to describe specific embodiments, but are not intended to limit this application. As used in the specification of this application and the appended claims, singular expressions "one", "a", "the", "the foregoing", "this", and "the one" are intended to also include an expression such as "one or more", unless otherwise explicitly indicated in the context.

Reference to "an embodiment" or "some embodiments" or the like described in this specification means that one or more embodiments of this application include a specific feature, structure, or characteristic described with reference to the embodiment. Therefore, expressions such as "in an embodiment", "in some embodiments", "in some other embodiments", and "in some different embodiments" that appear at different places in this specification do not necessarily indicate reference to a same embodiment, but mean "one or more but not all embodiments", unless otherwise specially emphasized. The terms "comprise", "include", and "have", and variants thereof all mean "including but not limited to", unless otherwise specially emphasized.

The following clearly and completely describes the technical solutions in the embodiments of this application with reference to the accompanying drawings in the embodiments of this application.

Figure 4:
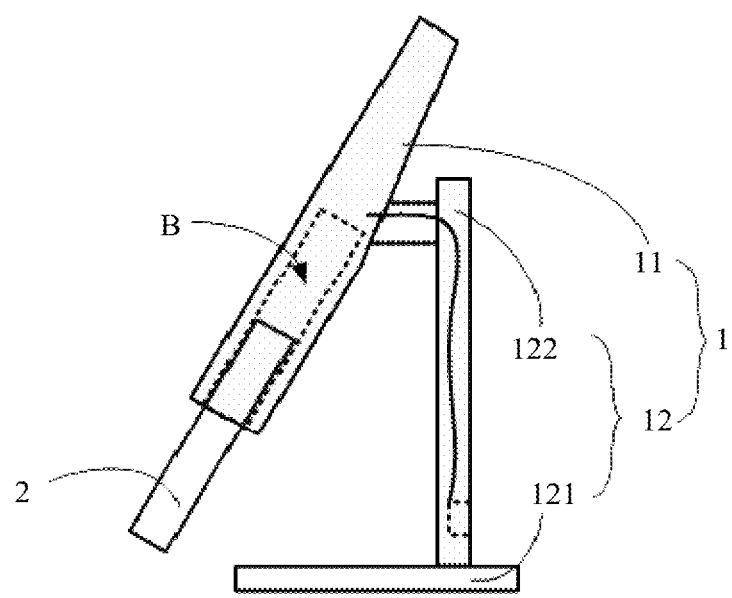
FIG. 4 is a diagram of a structure of an all-in-one computer according to an embodiment of this application.

FIG. 4 is a diagram of a structure of an all-in-one computer according to an embodiment of this application. In the structure shown in FIG. 4, the all-in-one computer 10 includes a monitor 1 and a host 2 that can transmit signals to each other. Specifically, the monitor 1 includes a display screen 11 and a support structure 12. The display screen 11 has an accommodating cavity B, and an opening of the accommodating cavity B is located on a peripheral side of the display screen 11. A user may insert or remove the host 2 from the opening of the accommodating cavity B based on a requirement of the user, so that the user can replace or update a hardware device in the host 2, thereby resolving a problem that a lifecycle of the monitor 1 is inconsistent with that of the host 2, improving product adaptability, and reducing costs of a consumer. In addition, because the host 2 is disposed in the accommodating cavity B of the monitor 1, external connections of the host 2 can be reduced, so that the all-in-one computer 10 provided in this embodiment of this application looks simple and beautiful.

Still referring to the structure shown in FIG. 4, the support structure 12 may be functionally divided into a base 121 and a stand 122. The stand 122 connects the display screen 11 to the base 121, and supports the display screen 11. For example, in the structure shown in FIG. 4, the display screen 11 is mounted on the stand 122 with an adjustable elevation angle, to meet user requirements for using the display screen at different angles. For example, the stand 122 may support an adjustment and locking of an elevation angle of the display screen 11 within a range of 0 to 30 degrees. In the structure shown in FIG. 4, when the opening of the accommodating cavity B is disposed on a bottom end face of the monitor 1, the host 2 may be removed out of or inserted into a lower part of the display screen 11 when the display screen 11 is tilted to a specific angle relative to the stand 122.

Figure 5:
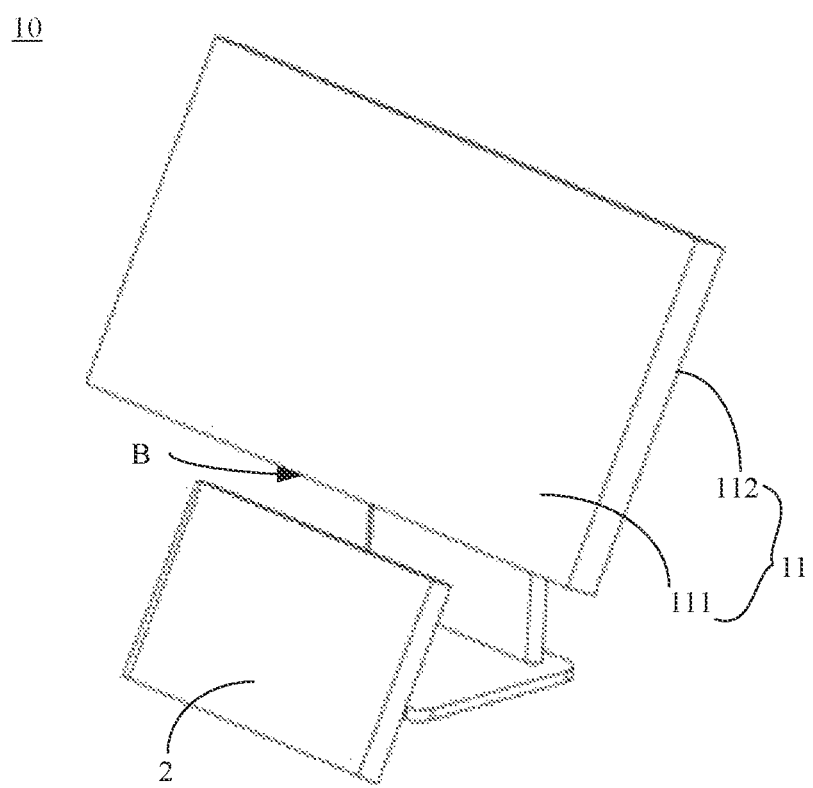
FIG. 5 is a diagram of a three-dimensional structure of an all-in-one computer according to an embodiment of this application.

FIG. 5 is a diagram of a three-dimensional structure of the all-in-one computer 10 according to an embodiment of this application. In the structure shown in FIG. 5, a display panel 111 shown in FIG. 5 is mounted on a "front side" of the display screen 11, and the display panel ill is configured to display a picture. Correspondingly, one side opposite to the "front side" is used as a "back" of the display screen 11, and a rear housing 112 shown in FIG. 5 is mounted on the "back" of the display screen 11. "Peripheral sides" of the display screen 11 are a "top end face", "bottom end face", "left end face", and "right end face" of the display screen 11. It should be understood that the opening of the accommodating cavity B is not limited to the bottom end face of the display screen 11 shown in FIG. 4. The opening of the accommodating cavity B may be further disposed on the "top end face", "bottom end face", or "left end face" of the display screen 11 based on a requirement. Details are not described herein again.

Figure 6:
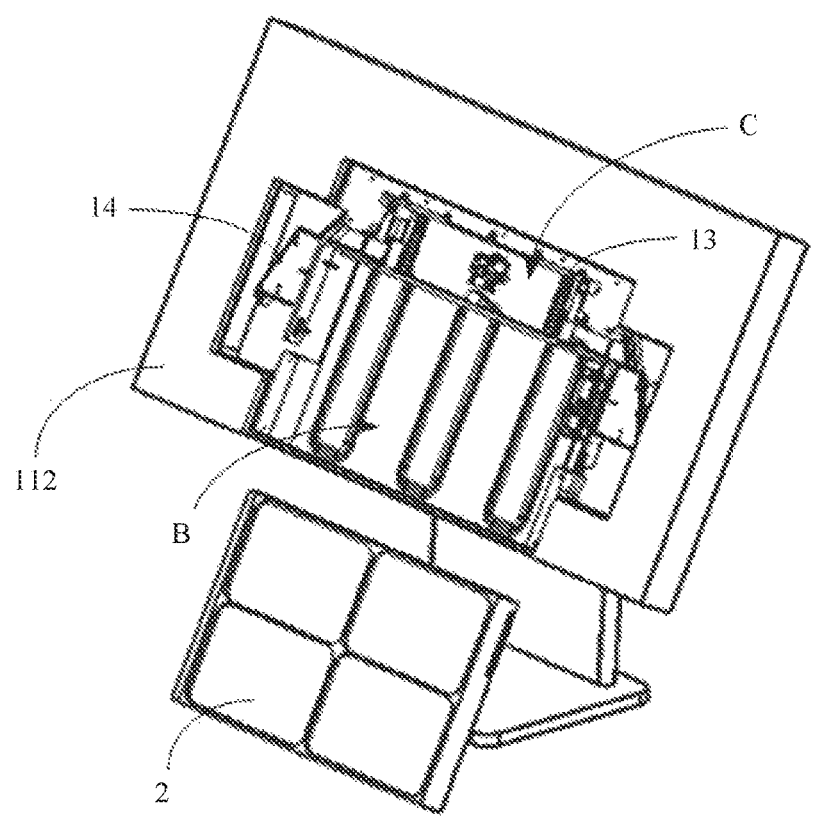
FIG. 6 is a schematic diagram of an internal structure of the structure shown in FIG. 5.

FIG. 6 is a schematic diagram of an internal structure of the structure shown in FIG. 5. With reference to the structure shown in FIG. 5, referring to FIG. 6, an accommodating space C is formed between the display panel 111 and the rear housing 112, a part of the accommodating space C forms the accommodating cavity B, and an insertion removal mechanism 13 configured to implement a function for inserting or removing the host 2 is disposed in the accommodating space C.

Figure 7:
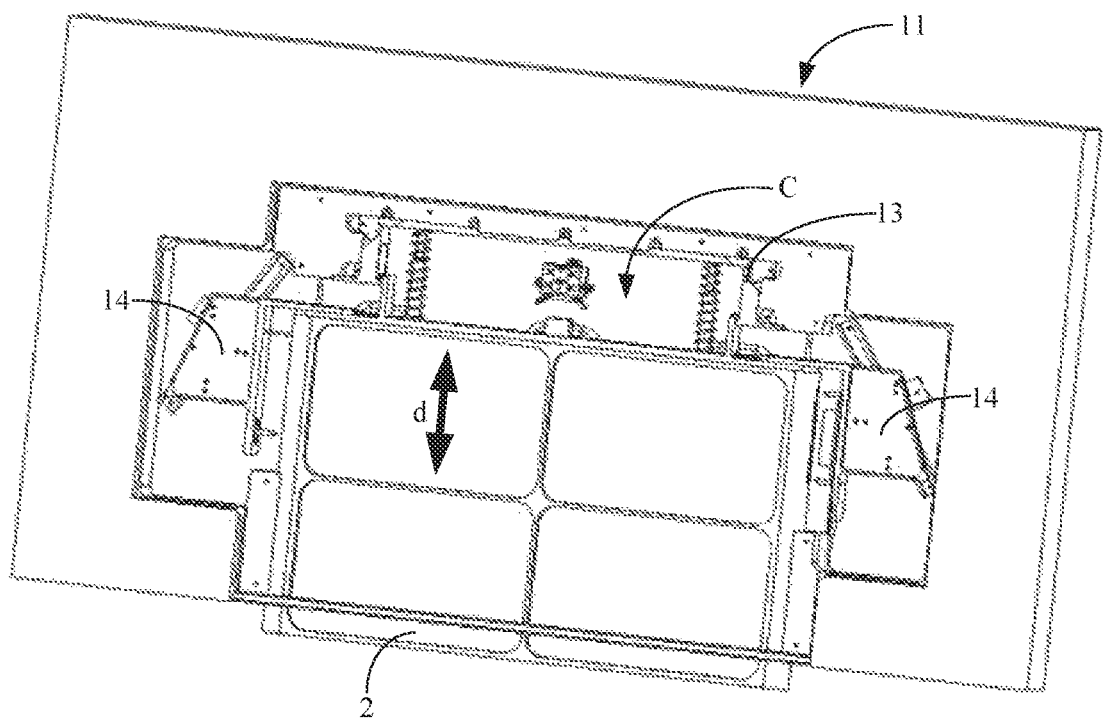
FIG. 7 is a schematic status diagram of an operation of inserting or removing a host in an all-in-one computer according to an embodiment of this application.

FIG. 7 is a schematic status diagram of an operation of inserting or removing the host 2. When the operation of inserting or removing the host 2 is performed, the host 2 moves relative to the accommodating space C along a direction d shown in FIG. 7. Specifically, when an operation of inserting the host 2 is performed, the host 2 moves upward in the direction d relative to the accommodating cavity B; and when an operation of removing the host 2 is performed, the host 2 moves downward in the direction d relative to the accommodating cavity B. It should be noted that a first connecting assembly 14 is disposed in the accommodating space C, where the first connecting assembly 14 is configured to connect to the host 2, to implement signal transmission between the monitor 1 and the host 2. In the structure shown in FIG. 7, a connection direction between the first connecting assembly 14 of the monitor 1 and the host 2 is perpendicular to the insertion/removal direction d of the host 2. This can prevent a relatively large force applied between the first connecting assembly 14 and the host 2 along the insertion/removal direction d in an insertion removal process of the host 2 from damaging a connection structure between the monitor 1 and the host 2, thereby prolonging service life of the connection structure between the monitor 1 and the host 2.

It should be understood that the connection direction between the first connecting assembly 14 of the monitor 1 and the host 2 is further parallel to a plane on which the display screen 11 in the monitor 1 is located. It should be noted that the parallel relationship may alternatively be approximately parallel, and details are not described herein.

For example, to ensure that a reliable and accurate interconnection operation is formed between the first connecting assembly 14 and the host 2 in the insertion/removal process of the host 2, two first connecting assemblies 14 at symmetrical positions may be disposed in the accommodating space C, to ensure that forces on two sides of the host 2 are relatively balanced during the connection.

Figure 8:
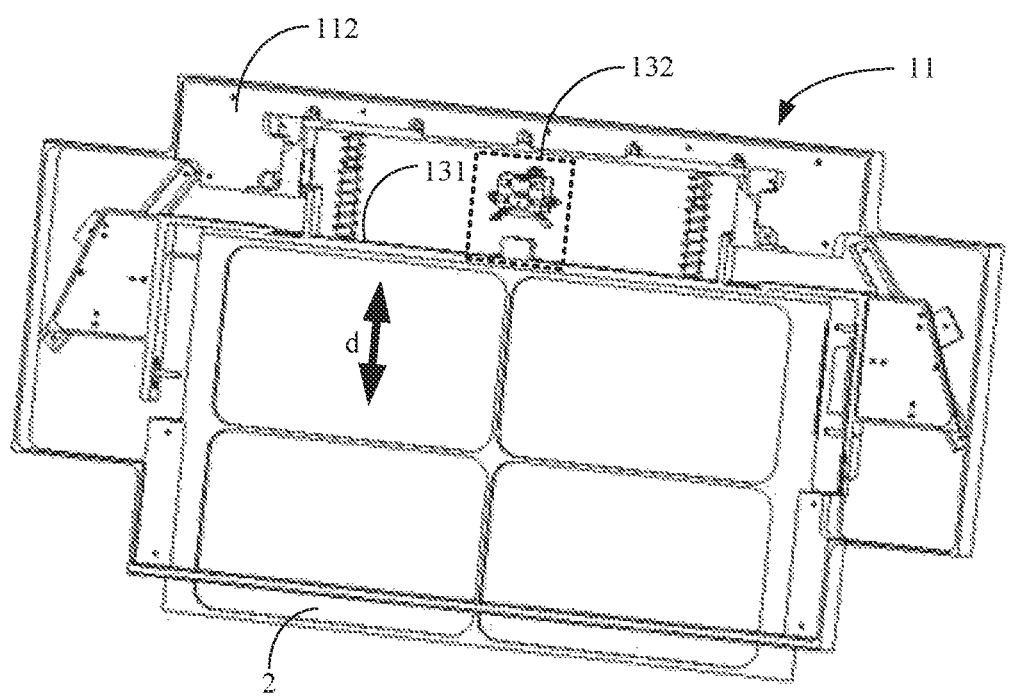
FIG. 8 is a schematic status diagram of an operation of inserting or removing a host in an all-in-one computer according to an embodiment of this application.
Figure 9:
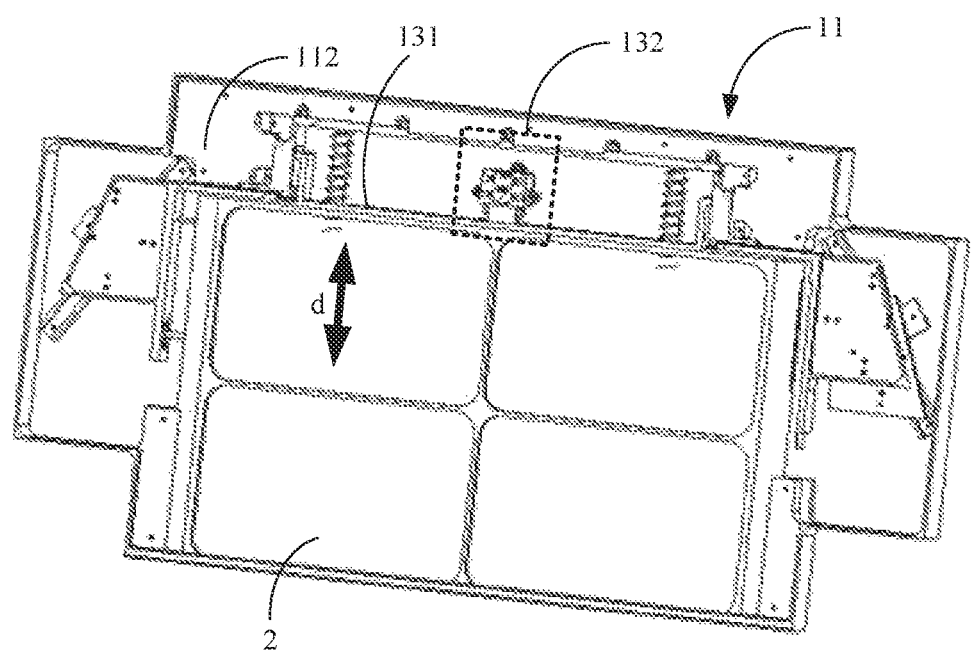
FIG. 9 is a schematic status diagram of an operation of inserting or removing a host in an all-in-one computer according to an embodiment of this application.

Specifically, when the user needs to mount the host 2, the user may insert the host 2 into the accommodating cavity B (the accommodating cavity B is covered by the host 2 and is not marked) from the opening of the lower end face of the display screen 11 in the structure shown in FIG. 8. The host 2 pushes a baseplate 131 to move in the direction d toward the inside of the accommodating cavity B. A locking assembly 132 is mounted on the baseplate 131 and the rear housing 112 in cooperation. The locking assembly 132 can enhance stability of the connection between the host 2 and the monitor 1, and can implement quick unlocking when the host 2 needs to be removed. Specifically, when the host 2 is embedded in a preset position of the accommodating cavity B, the locking assembly 132 is in a locked state, as shown in FIG. 9. When the user needs to remove the host 2, the locking assembly 132 may be switched from the locked state to an unlocked state, so that the host 2 can be removed out of the accommodating cavity from the opening.

Certainly, the opening of the accommodating cavity B may also be located on the "top end face", the "left end face", or the "right end face" of the display screen 11. In this case, the locking assembly 132 may not be disposed, or may be specifically disposed based on a use requirement. Details are not described herein again.

Figure 10:
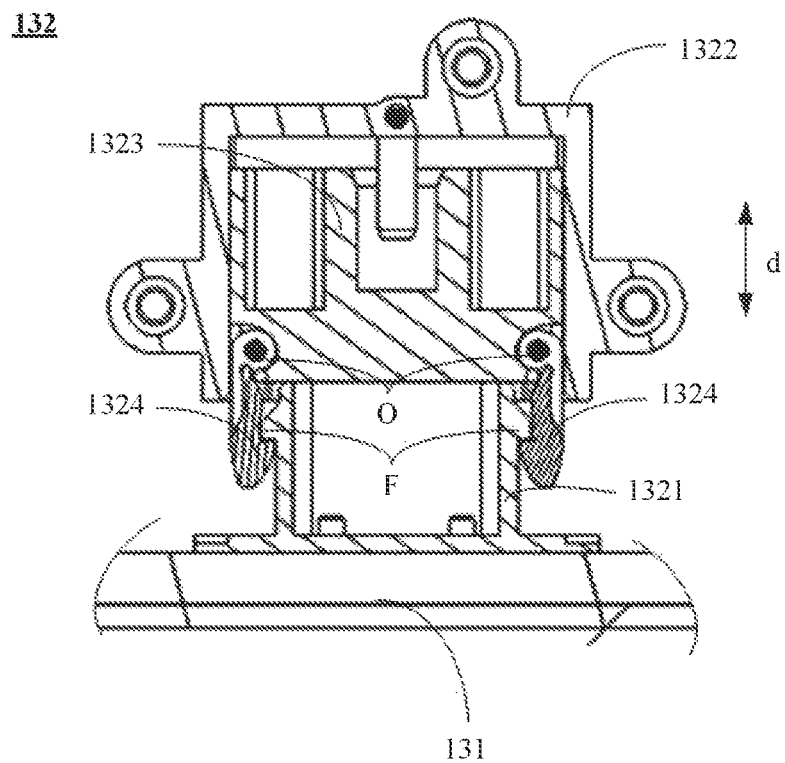
FIG. 10 is a diagram of a structure of a locking assembly according to an embodiment of this application.

FIG. 10 shows an example of a structure of the locking assembly 132. With reference to FIG. 9, referring to the structure shown in FIG. 10, a lock 1321 is mounted on the baseplate 131, a locking enclosure 1322 is mounted on the rear housing 112, and a button part 1323 and a hook 1324 are disposed inside the locking enclosure 1322. The button part 1323 runs through the rear housing 112, and is partially located on the back of the rear housing 112, so that the user can unlock the locking assembly 132 in one step. The hook 1324 is disposed on one side that is of the button part 1323 and that faces the baseplate 131. In addition, the hook 1324 is pivotally connected to the button part 1323 at a position 0. The hook 1324 may rotate around the pivotal joint O relative to the button part 1323 while moving along the direction b with the button part 1323.

In the structure shown in FIG. 10, specifically, the lock 1321 is provided with two symmetrically disposed protruding parts F, the button part 1323 is provided with two hooks 1324, and the hooks 1324 are in a one-to-one correspondence with the protruding parts F on the lock 1321.

When the lock 1321 moves with the baseplate 131 along the direction d toward the locking enclosure 1322, the lock 1321 on the baseplate 131 moves upward. After the lock 1321 presses against a lower surface of the button pail 1323, the lock 1321 pushes the button part 1323 to move upward along the direction d. In this process, the button part 1323 gradually penetrates into the locking enclosure 1322, the hook 1324 rotates around the pivotal joint O with the button part 1323 to a position shown in FIG. 1.0, and locks the corresponding protruding part F. It should be noted that, in this case, the locking enclosure 1322 prevents the hook 1324 from rotating around the pivotal joint O with the button part 1323, and the hook 1324 is in a clamping position, and the locking assembly 132 is in the locked state.

When the user presses the button part 1323, the hook 1324 moves downward with the button part 1323. In this process, the baseplate 131 is pushed to move downward along the direction d. The locking enclosure 1322 is exposed at the pivotal joint O between the two hooks 1324 and the button part 1323. The two hooks 1324 may respectively rotate around the pivotal joint O and expand under action of a driving assembly. The hook 1324 is switched from the clamping position to an expanding position, and the lock 1321 is released. The locking assembly 132 completes an unlocking action. In this way, releasing can be implemented in one step. A structure of the driving assembly is described in detail in a subsequent structure.

Figure 11:
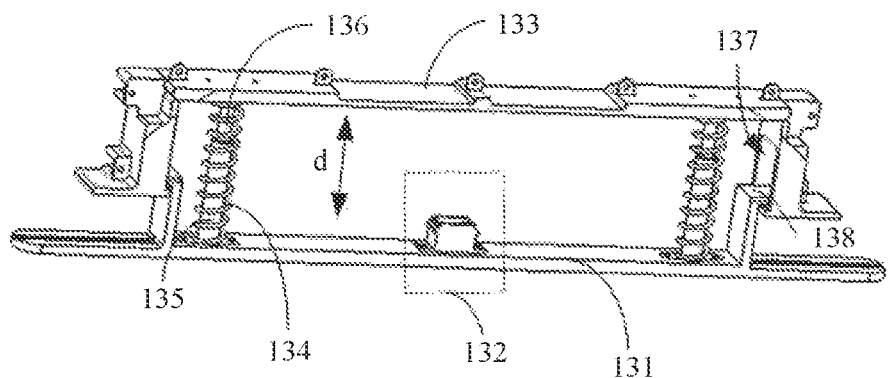
FIG. 11 is a schematic diagram of a partial structure of an insertion/removal mechanism in an all-in-one computer according to an embodiment of this application.

FIG. 11 is a schematic diagram of a partial structure of the insertion/removal mechanism 13. With reference to FIG. 9, referring to the structure shown in FIG. 11, the insertion/removal mechanism 13 further includes a support frame 133 disposed on the rear housing 112, and the support frame 133 and the baseplate 131 are arranged along the direction d. It should be understood that the baseplate 131 may move along the direction d relative to the support frame 133.

Still referring to the structure shown in FIG. 11, a spring set 134 is disposed between the baseplate 131 and the support frame 133. The spring set 134 is used as a driving assembly to connect the baseplate 131 and the support frame 133, and is configured to provide a driving force for the baseplate 131 to move downward along the direction d when the locking assembly 132 is switched from the locked state to the unlocked state. Specifically, the spring set 134 provides a driving force when the hook 1324 is switched from the clamping position to the expanding position. It should be understood that, when the locking assembly 132 is in the locked state, the spring set 134 is in an energy storage state. For example, the spring set 134 is in a compressed energy storage state.

Certainly, the spring set 134 can further facilitate a host removal operation. Specifically, after the locking assembly 132 is switched from the locked state to the unlocked state, the spring set 134 may further continue to apply a driving force to the baseplate 131, so that the host 2 can be removed from the opening of the accommodating cavity B more smoothly.

It should be noted that the spring set 134 may further store energy when the baseplate 131 is farthest from the support frame 133.

In addition, a guiding assembly is further disposed between the baseplate 131 and the support frame 133, and the guiding assembly can improve stability of the movement of the baseplate 131 relative to the support frame 133. For example, as shown in FIG. 11, the guiding assembly is a guide sleeve 135 disposed on the baseplate 131 and a guide post 136 disposed on the support frame 133. The guide sleeve 135 corresponds to the guide post 136, and each guide sleeve 135 is movably sleeved along the direction d over an outer side of a guide post 136 corresponding to the guide sleeve 135. It should be understood that FIG. 11 shows an example in which structures of two sets of guide sleeves 135 and guide posts 136 are disposed between the baseplate 131 and the support frame 133. Certainly, a quantity of guide sleeves 135 and a quantity of guide posts 136 may be changed based on a requirement, and details are not described herein again.

It should be noted that, to enhance stability of the spring set 134, a spring in the spring set 134 may be sleeved over an outer side of a corresponding guide sleeve 135 and guide post 136 in each pair; and to prevent the guiding assembly from interfering with the locking assembly 132, the locking assembly 132 may be disposed between the structures of two sets of guide sleeves 135 and guide posts 136.

Still referring to the structure shown in FIG. 11, the insertion/removal mechanism 13 may be further disposed to include a limiting assembly configured to limit a movement distance of the baseplate 131, to more accurately limit a movement distance of the baseplate 131 relative to the support frame 133. For example, the limiting assembly includes a guide groove 137 and a limiting block 138. Specifically, the guide groove 137 is disposed on one side that is of the support frame 133 and that faces the baseplate 131, and the guide groove 137 extends along the direction d. The guide groove 137 has a first limiting surface and a second limiting surface. In the first limiting surface and the second limiting surface, the first limiting surface is used to limit a maximum movement distance of the baseplate 131 along the direction d upward, and the second limiting surface is used to limit a maximum movement distance of the baseplate 131 along the direction d downward. The limiting block 138 is disposed on one side that is of the baseplate 131 and that faces the support frame 133, and the limiting block 138 corresponds to the guide groove 137. Each limiting block 138 is movably embedded along the direction d into a guide groove 137 corresponding to the limiting block 138.

It should be understood that structures of a plurality of pairs of corresponding guide grooves 137 and limiting blocks 138 may be disposed between the baseplate 131 and the support frame 133 based on a requirement. For example, in FIG. 11, two pairs of corresponding identical guide grooves 137 and limiting blocks 138 are disposed, and the two pairs of guide grooves 137 and the limiting blocks 138 are disposed opposite to each other.

Figure 12:
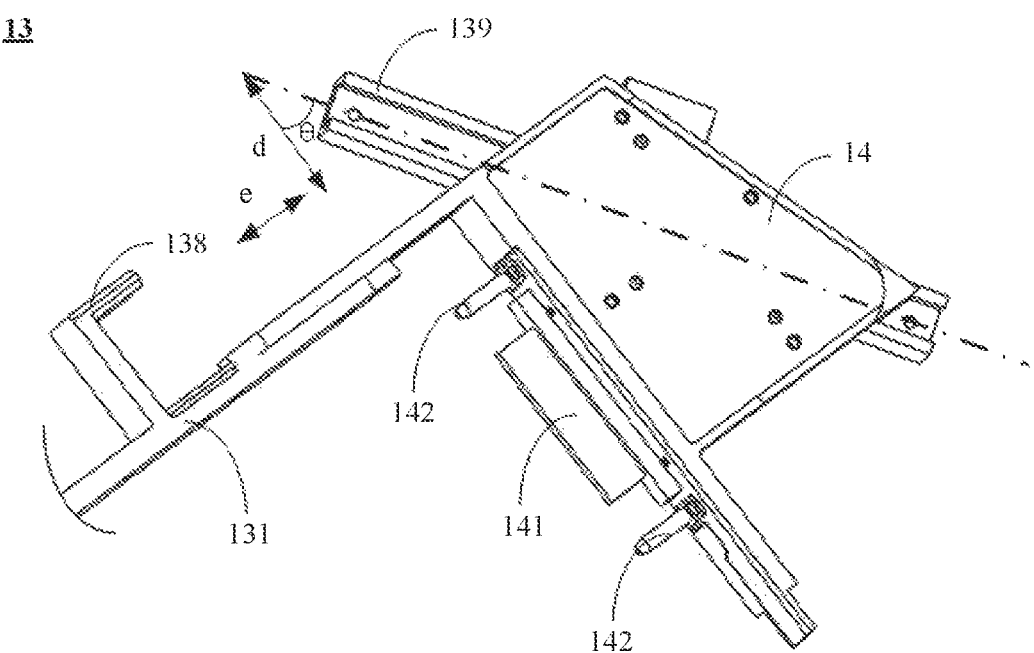
FIG. 12 is a schematic diagram of another partial structure of an insertion/removal mechanism in an all-in-one computer according to an embodiment of this application.

FIG. 12 is a schematic diagram of a partial structure of the insertion/removal mechanism 13. In the structure shown in FIG. 12, the insertion/removal mechanism 13 may further include an inclined guide rail 139. Specifically, included angles exist between an extension direction of the inclined guide rail 139 and the direction d, and an included angle θ that is in the included angles and that faces an opening side of the accommodating cavity is an acute angle. For example, the included angle θ is 25 degrees.

Still referring to the structure shown in FIG. 12, each first connecting assembly 14 is slidably mounted on the inclined guide rail 139 along the inclined guide rail 139, and the first connecting assembly 14 is slidably mounted on the baseplate 131 along a direction e. It should be noted that the direction e is perpendicular to the direction d. When the operation of inserting or removing the host 2 is performed, the host 2 drives the baseplate 131 to move along the direction d. In this case, the first connecting assembly 14 moves relative to the baseplate 131 along the direction e, and the first connecting assembly 14 moves relative to the inclined guide rail 139 along the extension direction of the inclined guide rail 139. In this case, a connection relationship between the first connecting assembly 14 and the baseplate 131 and the inclined guide rail 139 can implement directional conversion of an insertion/pull force, and a part of the insertion/pull force for up/down mounting is converted into a pressing force for interconnecting with the host 2 in a direction perpendicular to the mounting direction, so that the first connecting assembly 14 and the host 2 can be mounted conveniently.

In the foregoing movement process, the first connecting assembly 14 moves relative to the host 2 in the direction e to insert, remove, or connect the host 2. Specifically, in a process of inserting the host 2, the first connecting assembly 14 moves along the direction e toward the host 2 until the first connecting assembly 14 is connected to the host 2. In a process of removing the host 2, the first connecting assembly 14 moves along the direction e from a connected state to a direction away from the host 2.

Figure 13:
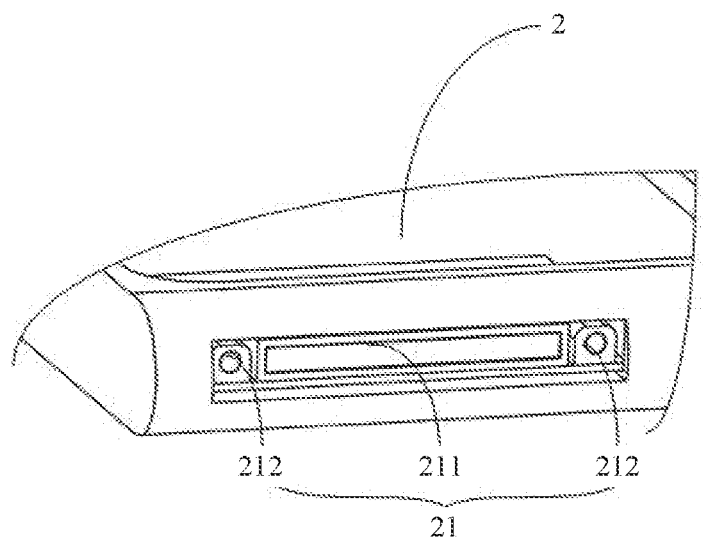
FIG. 13 is a schematic diagram of a structure of a host in an all-in-one computer according to an embodiment of this application.

FIG. 13 is a schematic diagram of a partial structure of the host 2 according to an embodiment of this application. A second connecting assembly 21 is formed on the host 2. The second connecting assembly 21 cooperates with the first connecting assembly 14 in FIG. 12 to form a high-speed high-density connector. The high-speed high-density connector may support a high-speed data interface and supply power. For example, the high-speed high-density connector may support transmission of high-speed signals of HDMI (high definition multimedia interface, high-definition multimedia interface) 2.1. DP (display port, display interface) 2.0, USB (universal serial bus, universal serial bus) 4, or the like, and supply 250 W@12 V power. When the host 2 is mounted in the accommodating cavity B, and the first connecting assembly 14 is connected to the second connecting assembly 21, a function for operating the host 2 can be transferred by using the high-speed high-density connector to the monitor 1 for implementation. In addition, the monitor 1 can supply power to the host 2 by using the high-speed high-density connector. Certainly, to ensure that the high-speed high-density connector toms a reliable and accurate interconnection operation in the insertion/removal process of the host 2, the insertion/removal mechanism 13 may be disposed to include two high-speed high-density connectors at symmetrical positions, to ensure that forces received on the two sides of the host 2 are relatively balanced.

With reference to the structure shown in FIG. 12, referring to FIG. 13, the first connecting assembly 14 in FIG. 12 is provided with a high-speed high-density connector (male end 141), and the second connecting assembly 21 in FIG. 13 is provided with a high-speed high-density connector (female end 211). In addition, to ensure accuracy of the connection between the first connecting, assembly 14 and the second connecting assembly 21, as shown in FIG. 13, positioning guide sleeves 212 located on two sides of the high-speed high-density connector (female end 211) are further disposed on the host 2. Correspondingly, in the structure shown in FIG. 12, the first connecting assembly 14 further includes positioning pins 142 disposed on two sides of the high-speed high-density connector (male end 141). It should be noted that the positioning pins 142 are in a one-to-one correspondence with the positioning guide sleeves 212, and when the first connecting assembly 14 is connected to the second connecting assembly 21, the positioning pins 142 are synchronously inserted into the positioning guide sleeves 212, for alignment in the insertion/removal process.

It should be understood that, when the high-speed high-density connectors (female ends 211) are disposed at symmetrical positions on both sides of the host 2, and high-speed high-density connectors (male ends 141) are disposed on the first connecting assembly 14, a foolproof effect can be achieved structurally, and a misoperation can be avoided.

Figure 14:
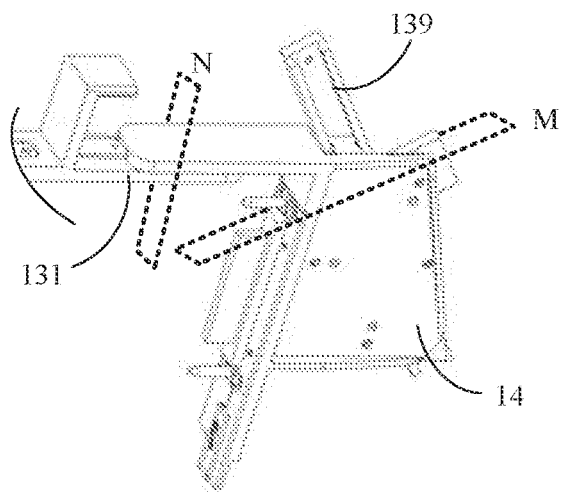
FIG. 14 is another schematic diagram of a partial structure of an insertion/removal mechanism in an all-in-one computer according to an embodiment of this application.
Figure 15:
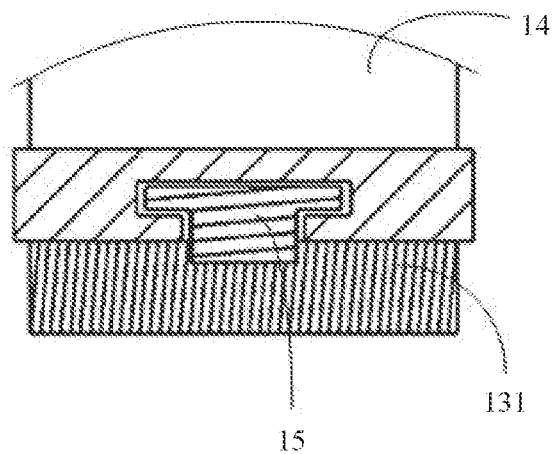
FIG. 15 is a sectional view of a plane N in FIG. 14.

FIG. 14 clearly shows a connection structure between the first connecting assembly 14 and the baseplate 131 and the inclined guide rail 139. A sectional view of a plane N in FIG. 14 is shown in FIG. 15. An extension arm of the first connecting assembly 14 is connected to an extension part of the baseplate 131. Specifically, a groove is disposed in the extension part of the baseplate 131, a T-shaped guide rail 15 fixedly connected to the groove is disposed in the groove, and a T-shaped sliding groove is disposed in the extension arm of the first connecting assembly 14. The T-shaped guide rail 15 is embedded into the T-shaped sliding groove to implement sliding cooperation between the first connecting assembly 14 and the baseplate 131.

Figure 16:
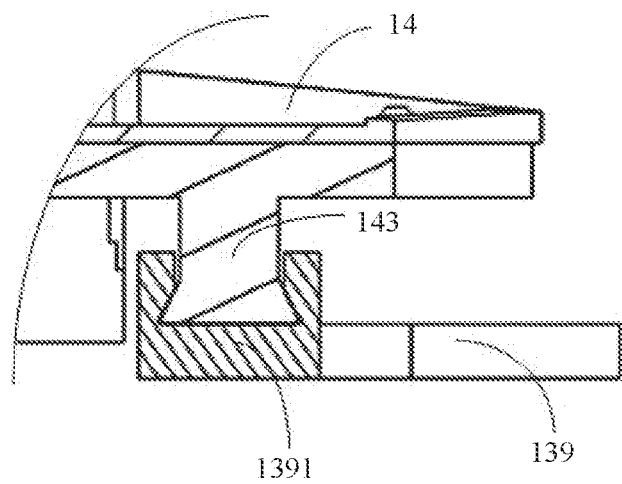
FIG. 16 is a sectional view of a plane M in FIG. 14.

A sectional view of a plane M in FIG. 14 is shown in FIG. 16. A dovetail structure is used between the first connecting assembly 14 and the inclined guide rail 139 for sliding cooperation. The dovetail structure has high precision and is capable of withdrawing a relatively large force. For example, the dovetail structure may be a split structure. A dovetail head 143 and the first connecting assembly 14 are fastened by using a screw, and form sliding cooperation with a dovetail groove 1391 of the inclined guide rail 139.

Figure 17:
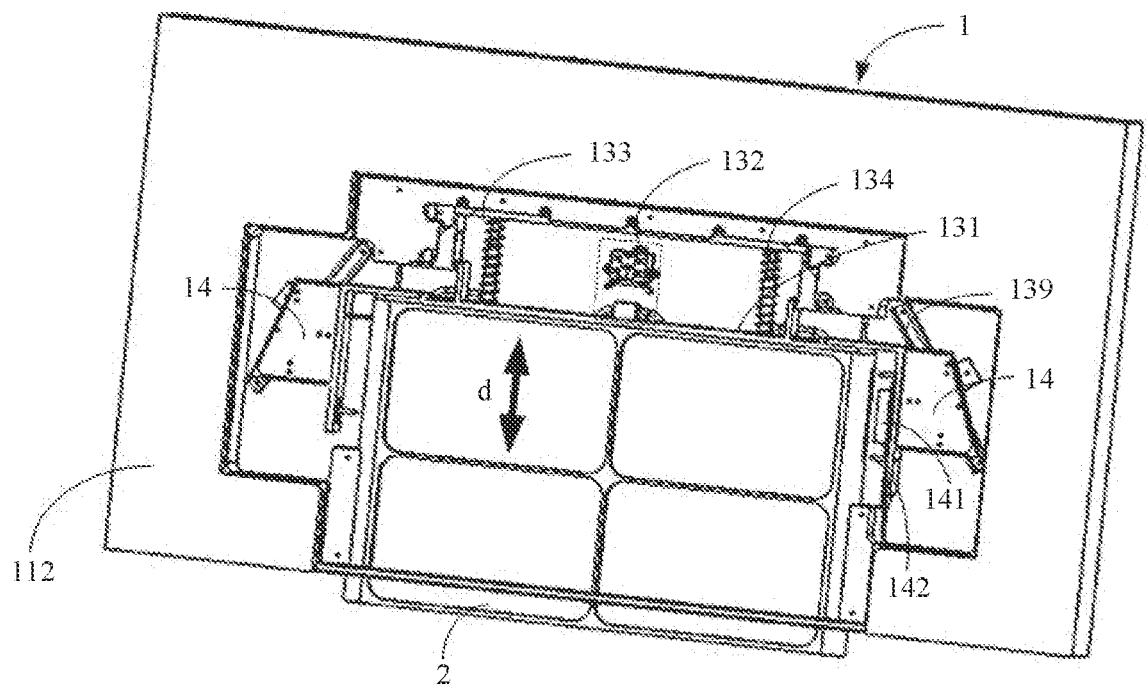
FIG. 17 is a schematic status diagram of an operation of inserting or removing a host in an all-in-one computer according to an embodiment of this application.

With reference to a structure shown in FIG. 17, the following describes in detail a movement process of each mechanical part when a host 2 in an all-in-one computer 10 provided in an embodiment of this application is assembled relative to a monitor 1 with reference to the foregoing structures.

Step 1: Insert the host 2 into the monitor 1 from an opening at a lower part after alignment. In an initial state in which the host 2 is inserted, a baseplate 131 is located at a farthest position away from a support frame 133 under action of a spring set. In this case, first connecting assemblies 14 on two sides are located at a lowest end of an inclined guide rail 139, a high-speed high-density connector (male end 141) and a positioning pin 142 of the first connecting assembly 14 are in a ready position, and a locking assembly 132 is in an unlocked state.

Step 2: Insert the host 2 from the lower part of the monitor 1 gradually. In this case, the baseplate 131 is pushed by the host 2 to move toward the support frame 133. In this case, the first connecting assembly 14 also moves upward with the baseplate 131. Under action of the inclined guide rail 139, the first connecting assembly 14 moves toward the host 2 along an extension direction of the baseplate 131. In this case, the positioning pin 142 on the first connecting assembly 14 gradually approaches a positioning guide sleeve (not shown in FIG. 17 due to an angle of view) on the host 2, and completes cooperation in the insertion/removal to form a connection. After the high-speed high-density connector completes the alignment and connection, the baseplate 131 also moves to a position closest to the support frame 133, and triggers the locking assembly 132 to switch to a locked state. In addition, a spring set 134 in a driving assembly on the support frame is in an energy storage state, and maintains a pre-tightening force to store energy for releasing an insertion/removal mechanism 13.

Step 3: After a user presses a button part (not shown in FIG. 17 due to an angle of view) of the locking assembly 132 located on a rear housing 112, the locking assembly 132 is switched from the locked state to the unlocked state, and the spring set 134 extends to release energy, and pushes down the baseplate 131. In addition, the positioning pin 142 on the first connecting assembly 14 is separated from the positioning guide sleeve on the host 2 to release a connection relationship of the high-speed high-density connector, and the host 2 is disconnected from the monitor 1.

Figure 18:
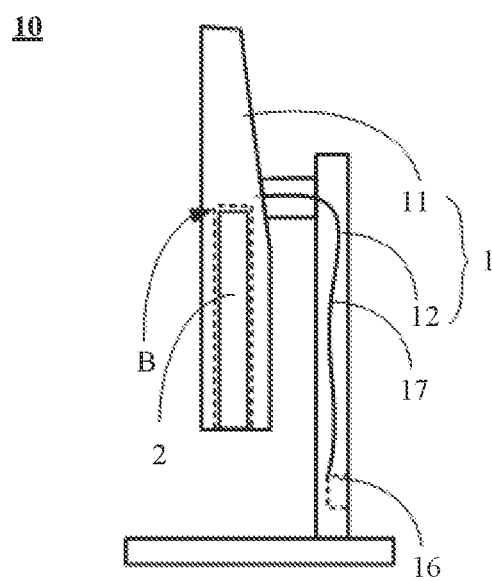
FIG. 18 is a schematic diagram of a structure of an all-in-one computer according to an embodiment of this application.

FIG. 18 is a schematic diagram of a structure of an all-in-one computer 10 according to an embodiment of this application. A third connecting assembly 16 is disposed on a monitor 1, and the third connecting assembly 16 is configured to connect to an external device. For example, the third connecting assembly 16 includes at least one of a DC (direct current, direct current) interface, an RJ45 interface, an HIM (high definition multimedia interface, high definition multimedia) interface, or a USB (universal serial bus, universal serial bus) interface. A type of the USB interface may be a type C or a type A. In addition, the third connecting assembly 16 is connected to a first connecting assembly 14 (not shown in FIG. 18) by using a cable 17, to form a connection path between the third connecting assembly 16, the first connecting assembly 14, and a second connecting assembly 21 (not shown in FIG. 18). It should be noted that the cable 17 is hidden inside the monitor 1, so that aesthetics of the all-in-one computer 10 provided in this embodiment of this application can be enhanced.

Figure 19:
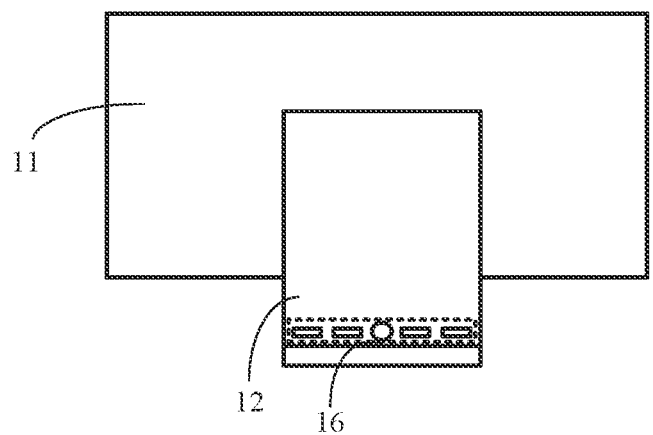
FIG. 19 is a schematic diagram of a back structure of the all-in-one computer in FIG. 18.

FIG. 19 is a schematic diagram of a back structure of the all-in-one computer 10 in FIG. 18. It can be learned from the structure shown in FIG. 19 that the third connecting assembly 16 is disposed on a support structure 12. Certainly, the third connecting assembly 16 may be further disposed on a display screen 11 based on a requirement. Details are not described herein again.

Figure 20:
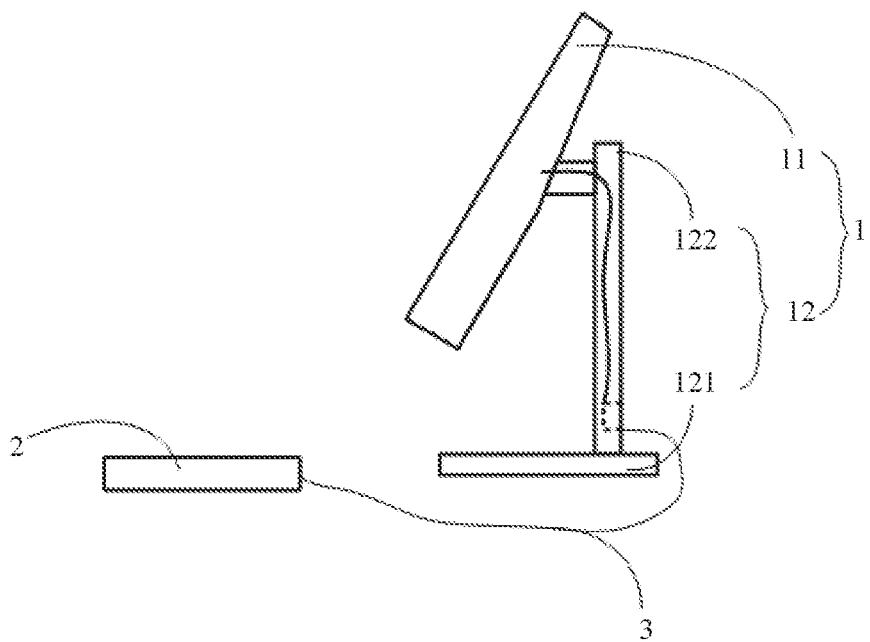
FIG. 20 is a schematic diagram of another structure of an all-in-one computer according to an embodiment of this application.

A host 2 in the all-in-one computer 10 provided in this embodiment of this application may alternatively have a structure shown in FIG. 20. The host 2 is removed from an accommodating cavity of the monitor 1 and used as an independent host, and an external cable 3 is disposed to connect the host 2 to the monitor 1.

Figure 21:
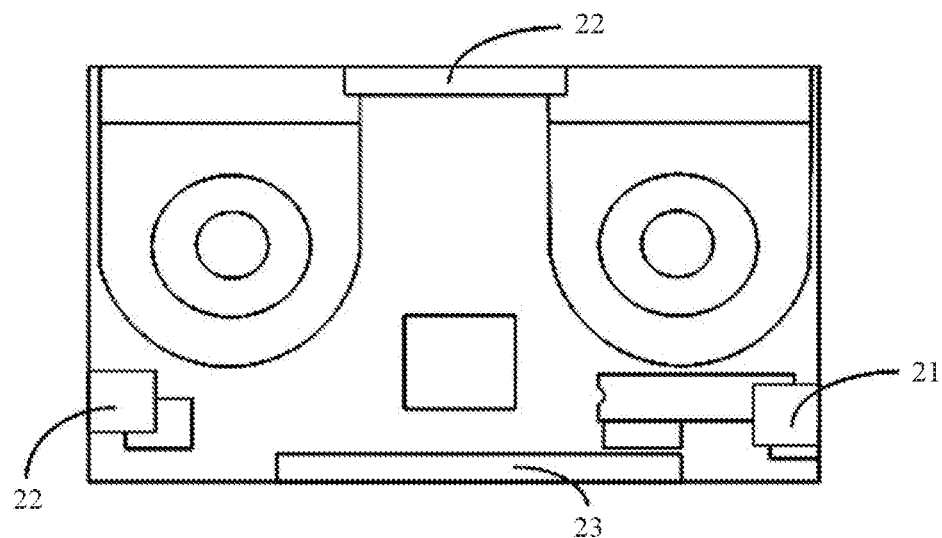
FIG. 21 is a schematic diagram of still another structure of a host in an all-in-one computer according to an embodiment of this application.

To meet a signal transmission requirement when the host 2 is used as an independent host, as shown in FIG. 21, a fourth connecting assembly 22 and a power button 23 may be further disposed on the host 2. Specifically, the fourth connecting assembly 22 includes a DC (direct current, direct current) interface, and further includes at least one of an RJ45 interface, an HDMI (high definition multimedia interface, high definition multimedia) interface, or a USB (universal serial bus, universal serial bus) interface. A type of the USB interface may be the type C or the type A. In addition, the fourth connecting assembly 22 may further include an earphone jack.

In the structure shown in FIG. 21, the RJ45 interface, the DC interface, and the earphone jack may be disposed on a rear side of the host 2 (one side facing a baseplate 131), the power button 23 may be disposed on a front side of the host 2, and the second connecting assembly 21 and the USB interface are respectively disposed on two opposite sides of the host 2. Certainly, a position for disposing each port may also be changed based on a requirement, and details are not described herein.

When the host 2 is used as an independent host, at least the following several possibilities are included.

In a specific implementation solution, when only the power interface is disposed on the fourth connecting assembly 22 of the host 2, the power interface of the host 2 may be connected to the monitor 1 by using an external cable 3, so that the monitor 1 supplies power to the host 2. In addition, a first wireless module is disposed in the monitor 1, a second wireless module is disposed in the host 2, and data transmission between the host 2 and the monitor 1 is implemented by connecting the first wireless module and the second wireless module.

In another specific implementation, when only the power interface is disposed on the fourth connecting assembly 22 of the host 2, the fourth connecting assembly 22 may be connected to an external power supply device by using an external cable 3, to supply power to the host. In addition, the first wireless module of the monitor 1 is connected to the second wireless module of the host 2, to implement data transmission between the host 2 and the monitor 1 in another specific implementation, when various interfaces are disposed on the fourth connecting assembly 22 of the host 2, the interfaces of the host 2 are independently connected by using different external cables, to meet power supply and network requirements of the host 2. In addition, an external cable 3 may be used to connect the host 2 and the monitor 1 to implement data transmission between the host and the monitor.

In another specific implementation, when various interfaces are disposed on the fourth connecting assembly 22 of the host 2, the interfaces of the host 2 are independently connected by using different cables, to meet power supply and network requirements of the host 2. In addition, the tint wireless module of the monitor 1 may be connected to the second wireless module of the host 2, to implement data transmission between the host 2 and the monitor 1.

It should be noted that a wireless communication mode between the first wireless module and the second wireless module may be, for example, a short-range communication mode such as wireless fidelity (wireless fidelity. Wi-Fi) or Bluetooth.

Figure 22:
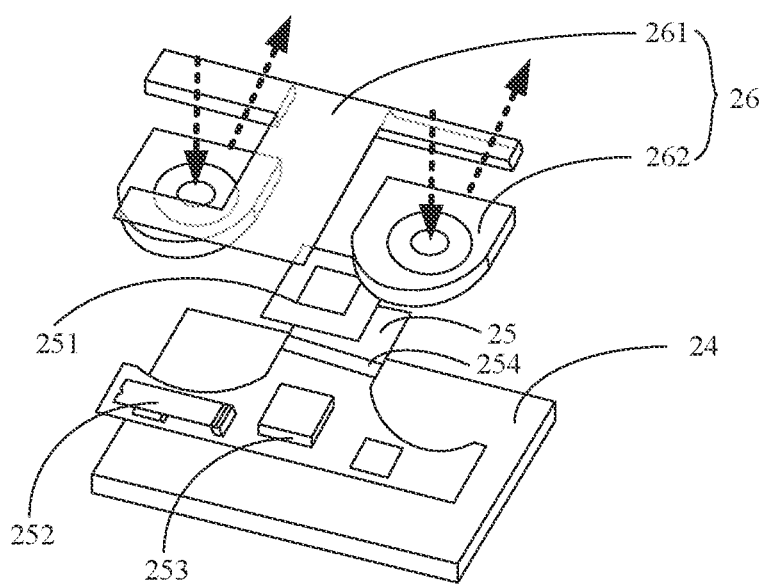
FIG. 22 is a schematic diagram of still another structure of a host in an all-in-one computer according to an embodiment of this application.

In specific disposition of an internal structure of the host 2, in a structure shown in FIG. 22, the host 2 may be disposed to include a chassis 24, a mother board 25 is disposed in the chassis 24, and the second connector 21 (not shown in FIG. 22) has a signal connection to the mother board 25. It should be noted that a plurality of functional components are disposed on the mother board 25. For example, a GPU (Graphics Processing Unit, graphics processing unit) module 251, a second wireless module 252, a CPU (central processing unit, central processing unit) module 253, and a memory 254 are disposed on the mother hoard 25.

Because the functional components on the mother board 25 generate heat during working, to maintain normal running of the functional components, a heat dissipation structure 26 may be further disposed in the host 2. The heat dissipation structure 26 may transfer heat inside the chassis 24 to the outside of the chassis 24, to reduce an ambient temperature inside the chassis 24, thereby dissipating heat for the functional components. For example, the heat dissipation structure 26 may include a heat sink 261 and a fan structure 262.

Still referring to the structure shown in FIG. 22, the heat sink 261 is a heat equalization plate structure. The heat sink 261 transfers heat generated when the main functional components work to an outlet of the fan 262, and the outlet of the fan 262 outputs air and discharges the air out of the chassis 24 to implement heat dissipation. An air intake direction and an air exhaust direction of the fan 262 are specifically shown by directions of arrows in FIG. 22.

Figure 23:
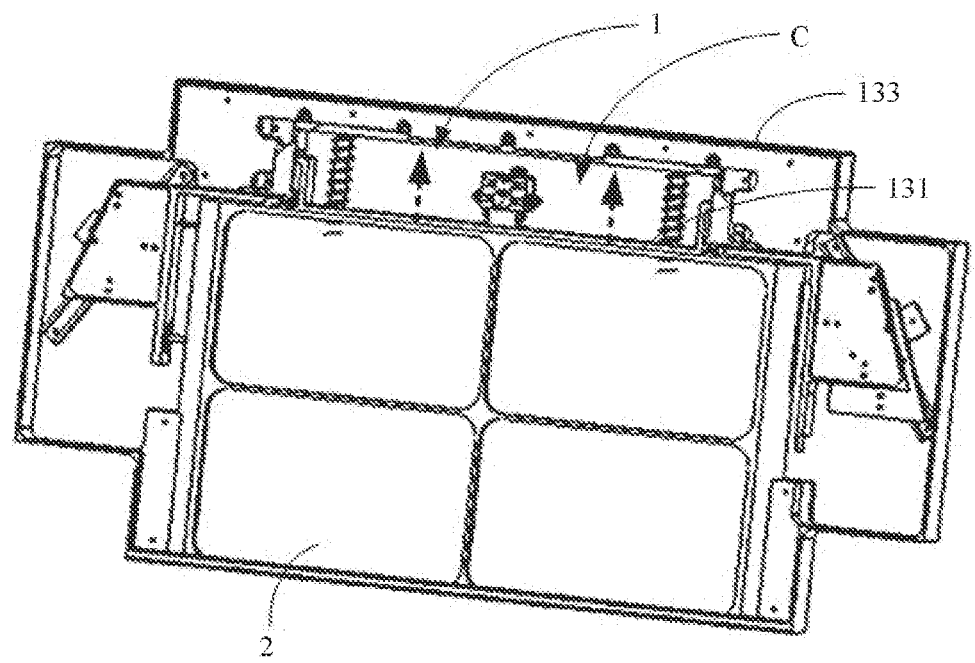
FIG. 23 is a schematic status diagram of an operation of inserting or removing a host in an all-in-one computer according to an embodiment of this application.

It should be noted that, after the host 2 is inserted into the monitor 1, an air exhaust direction of the fan 262 faces a support frame 133, specifically as shown in FIG. 23. It should be understood that an accommodating space C in the monitor 1 has specific space. Therefore, air discharged by the host 2 may flow in the accommodating space.

To better meet a heat dissipation requirement of the host 2, in one aspect, in specific disposition of the host 2, an air intake vent may be disposed on one side that is of the chassis 24 and that faces the rear housing 112, and an air exhaust vent is disposed on one side that is of the host 2 and that presses against the baseplate 131, so that an air flow channel inside the chassis 24 is formed between the air intake vent and the air exhaust vent. Certainly, to prevent the air exhaust vent from being blocked by the baseplate 131, a hollow opening may be disposed at a corresponding position of the baseplate 131, or the baseplate 131 and the air exhaust vent are staggered.

Figure 24:
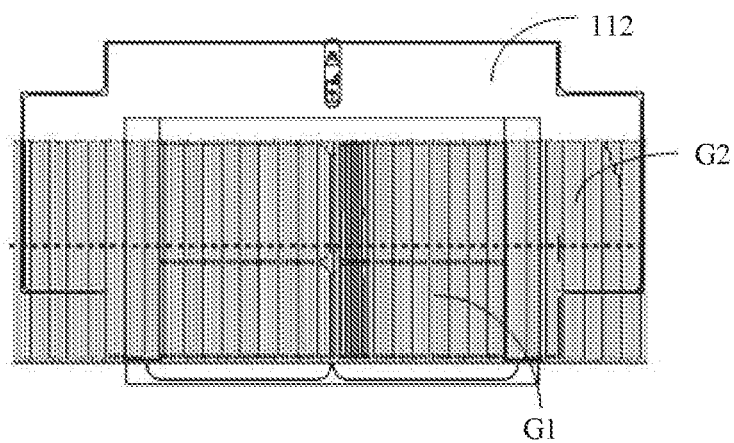
FIG. 24 is a schematic diagram of a structure of a rear housing in an all-in-one computer according to an embodiment of this application.

In another aspect, in specific disposition of the monitor 1, the rear housing 112 of the monitor 1 may be provided with a hollow area. Specifically, in a structure shown in FIG. 24, the hollow area of the rear housing 112 may be divided into a first area G1 and a second area G2, and the first area G1 is located on one side close to a bottom of the display screen 11. Because hot air generally rises, the first area G corresponds to the air intake vent of the host 2 and is used as an air intake vent of the monitor 1. Correspondingly, the second area G2 is used as an air exhaust vent of the monitor 1.

The foregoing descriptions are merely specific implementations of this application and not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An all-in-one computer comprising:
   a monitor comprising:
      a display screen comprising an accommodating cavity, a display panel, and a rear housing disposed on a back of the display panel, wherein the accommodating cavity comprises an opening located on a peripheral side of the display screen; and
      a first connecting assembly disposed in the accommodating cavity; and
   a host comprising:
      a second connecting assembly;
      a chassis;
      an air intake vent that is disposed on a side of the chassis and that faces the rear housing;
      an air exhaust vent disposed at a side that is of the chassis and that presses against a baseplate; and
      an air flow channel that is inside the chassis and that is formed between the air intake vent and the air exhaust vent,
   wherein the host is configured to be detachably mounted in the accommodating cavity from the opening,
   wherein when the host is mounted in the accommodating cavity, the second connecting assembly is configured to connect to the first connecting assembly to provide signal transmission between the host and the monitor,
   wherein a second direction of connecting the second connecting assembly and the first connecting assembly is perpendicular to a first direction,
   wherein the first direction is an insertion/removal direction of the host, and
   wherein the second direction is parallel to a plane on which the display screen is located.

2. The all-in-one computer according to claim 1, wherein the rear housing is configured to form with the display panel an accommodating space, wherein the accommodating space comprises the accommodating cavity, and wherein the display screen further comprises an insertion/removal mechanism mounted in the accommodating space and configured for inserting or removing the host.

3. The all-in-one computer according to claim 2, wherein the insertion/removal mechanism comprises:
   the baseplate configured to bear the host and is movably mounted on the rear housing along the first direction; and
   a locking assembly, wherein the locking assembly is configured to be in a locked state and an unlocked state, wherein when the locking assembly is in the locked state, the host is mounted in the accommodating cavity, and wherein when the locking assembly is in the unlocked state, the host is removable out of the accommodating cavity from the opening.

4. The all-in-one computer according to claim 3, wherein the locking assembly comprises:
   a lock disposed on the baseplate;
   a hook disposed on the rear housing and configured to engage with the lock, wherein the hook has a clamping position and an expanding position, wherein when the hook is in the clamping position, the hook clamps the lock and the locking assembly is in the locked state, and wherein when the hook is in the expanding position, the locking assembly is in the unlocked state;
   a driving assembly configured to drive the hook to switch from the clamping position to the expanding position; and
   a button part configured to drive the driving assembly, wherein the button part is disposed through the rear housing and is partially located on a back of the rear housing.

5. The all-in-one computer according to claim 3, wherein the insertion/removal mechanism further comprises an inclined guide rail disposed in the accommodating space, and wherein the inclined guide rail has an extension direction that forms with the first direction angles including an acute angle that faces an opening side of the accommodating cavity.

6. The all-in-one computer according to claim 5, wherein the first connecting assembly is movably mounted on the inclined guide rail along the extension direction, wherein the first connecting assembly is movably mounted on the baseplate along the second direction.

7. The all-in-one computer according to claim 1, wherein the first connecting assembly and the second connecting assembly are configured to collectively form a high-speed high-density connector.

8. The all-in-one computer according to claim 7, wherein the first connecting assembly comprises a male end of the high-speed high-density connector, and wherein the second connecting assembly comprises a female end of the high-speed high-density connector.

9. The all-in-one computer according to claim 1, wherein the host further comprises:
   a mother board disposed in the chassis and configured to provide a signal to the second connecting assembly; and
   functional components mounted on the mother board.

10. The all-in-one computer according to claim 1, wherein the display screen further comprises a hollow area comprising the rear housing, and further comprising:
   a first area located on a side of the hollow area in proximity of a bottom of the display screen and corresponding to the air intake vent of the chassis; and
   a second area, wherein the first area and the second area are arranged along the first direction.

11. The all-in-one computer according to claim 1, wherein the monitor further comprises:
   a support structure configured to support the display screen;
   a third connecting assembly configured to connect to an external device and comprising a signal connection to the first connecting assembly, wherein the third connecting assembly is disposed on the support structure or the monitor.

12. The all-in-one computer according to claim 11, wherein the host further comprises a fourth connecting assembly configured to connect to the external device or another external device.

13. The all-in-one computer according to claim 12, further comprising a cable, wherein when the host is removed out of the accommodating cavity from the opening, the cable is configured to connect the fourth connecting assembly and the third connecting assembly to provide a data connection between the host and the monitor.

14. The all-in-one computer according to claim 12, wherein the monitor further comprises a first wireless module, wherein the host further comprises a second wireless module, and wherein when the host is removed out of the accommodating cavity from the opening, the first wireless module is configured to connect to the second wireless module to provide a data connection between the host and the monitor.

15. The all-in-one computer according to claim 12, wherein the fourth connecting assembly comprises:
a power interface; and
at least one of an RJ45 interface, a high definition multimedia interface (HDMI), or a universal serial bus (USB) interface.

16. An all-in-one computer comprising:
a monitor comprising:
a display screen comprising an accommodating cavity, a display panel, and a rear housing disposed on a back of the display panel, wherein the accommodating cavity comprises an opening located on a peripheral side of the display screen; and
a first connecting assembly disposed in the accommodating cavity; and
a host comprising:
a second connecting assembly;
a chassis;
an air intake vent that is disposed on a side of the chassis and that faces the rear housing;
an air exhaust vent disposed at a side that is of the chassis and that presses against a baseplate; and
an air flow channel that is inside the chassis and that is formed between the air intake vent and the air exhaust vent,
wherein the host is configured to be detachably mounted in the accommodating cavity from the opening,
wherein a second direction of connecting the second connecting assembly and the first connecting assembly is perpendicular to a first direction,
wherein the first direction is an insertion/removal direction of the host, and
wherein the second direction is parallel to a plane on which the display screen is located.

17. The all-in-one computer according to claim 16, wherein when the host is mounted in the accommodating cavity, the second connecting assembly is configured to connect to the first connecting assembly to provide signal transmission between the host and the monitor.

18. The all-in-one computer according to claim 16, wherein the rear housing is configured to form with the display panel an accommodating space, wherein the accommodating space comprises the accommodating cavity, and wherein the display screen further comprises an insertion/removal mechanism mounted in the accommodating space and configured for inserting or removing the host.

19. The all-in-one computer according to claim 18, wherein the insertion/removal mechanism comprises:
the baseplate configured to bear the host and is movably mounted on the rear housing along the first direction; and
a locking assembly, wherein the locking assembly is configured to be in a locked state and an unlocked state, wherein when the locking assembly is in the locked state, the host is mounted in the accommodating cavity, and wherein when the locking assembly is in the unlocked state, the host is removable out of the accommodating cavity from the opening.

20. The all-in-one computer according to claim 16, wherein the host further comprises:
a mother board disposed in the chassis and configured to provide a signal to the second connecting assembly; and
functional components mounted on the mother board.

* * * * *